US008813574B2

(12) United States Patent
Fischer

(10) Patent No.: US 8,813,574 B2
(45) Date of Patent: Aug. 26, 2014

(54) METHOD FOR TESTING THE TENSION STRESS IN TENSION ELEMENTS OF TENSION ELEMENT CORD

(75) Inventor: Daniel Fischer, St-Triphon (CH)

(73) Assignee: Inventio AG, Hergiswil (CH)

( * ) Notice: Subject to any disclaimer, the term of this patent is extended or adjusted under 35 U.S.C. 154(b) by 104 days.

(21) Appl. No.: 13/505,876

(22) PCT Filed: Oct. 27, 2010

(86) PCT No.: PCT/EP2010/066213

§ 371 (c)(1), (2), (4) Date: May 3, 2012

(87) PCT Pub. No.: WO2011/054708

PCT Pub. Date: May 12, 2011

(65) Prior Publication Data

US 2012/0222490 A1 Sep. 6, 2012

(30) Foreign Application Priority Data

Nov. 3, 2009 (EP) .................................... 09174825

(51) Int. Cl.

*G01N 3/08* (2006.01)
*G01L 5/04* (2006.01)

(52) U.S. Cl.

USPC ........................... 73/828; 73/826; 73/862.391

(58) Field of Classification Search

USPC ................. 73/828, 826, 862.46, 856, 862.56, 73/862.391; 33/810

See application file for complete search history.

(56) References Cited

U.S. PATENT DOCUMENTS 4,245,512 A * 1/1981 Saunders ........................ 73/789
5,390,550 A * 2/1995 Miller ........................ 73/862.46
6,098,301 A * 8/2000 Kapphahn ....................... 33/492
7,984,565 B2 * 7/2011 Wu ................................ 33/811

FOREIGN PATENT DOCUMENTS

| | | | |
|---|---|---|---|
| EP | 0498051 | A2 | 8/1992 |
| EP | 0573831 | A1 | 12/1993 |
| EP | 1847501 | A2 | 10/2007 |
| JP | 2005345164 | A | 12/2005 |

* cited by examiner

*Primary Examiner* — Lisa Caputo
*Assistant Examiner* — Jonathan Dunlap
(74) *Attorney, Agent, or Firm* — Fraser Clemens Martin & Miller LLC; William J. Clemens

(57) ABSTRACT

A method and device for testing the tensile stress in tension elements of a tension element cord utilizes a measuring gage which is clamped between two tension elements of the tension element cord. The gage establishes a reference point relative to a fixed point stationary with respect to the tension element cord. The gage extends horizontally between two vertically extending length portions of the two tension elements. Then it is determined whether the reference point of the measuring gage is shifted with respect to the fixed point in the horizontal direction, wherein such a shift is dependent on a difference in the tension stresses in the two tension elements.

9 Claims, 7 Drawing Sheets

METHOD FOR TESTING THE TENSION STRESS IN TENSION ELEMENTS OF TENSION ELEMENT CORD

FIELD

The invention relates to a method and a device for testing the tension stress in tension elements of a tension element cord.

BACKGROUND

There are various elevator and load transport systems which have a number of tension elements, for example flat or V-ribbed belts, for carrying and driving the elevator car or a platform. The tension elements are typically fixed in the region of a counterweight, carry a counterweight, are deflected at an upper (driving) pulley and then, for example in the form of an underloop, run through under the elevator car and are fixed on the other side of the elevator car. This fixing is also designated as a car-side tension element fixed point, whereas fixing in the region of the counterweight is designated as a counterweight-side tension element fixed point.

There are various possibilities for implementing these tension element fixed points in concrete terms.

In the elevator and load transport systems, during assembly, but also during maintenance, it is determined whether the tension elements of a suspension cord are uniformly loaded, for example in order to test whether uniform load distribution is ensured. The outlay hitherto involved in this respect is relatively high, and the equipment which is sometimes used is costly and sensitive.

A corresponding measuring instrument is known from the published patent application EP 573831 A1. This measuring instrument comprises a torsionally and flexurally resistant force sensor, so that as accurate evidence as possible as to the instantaneous tensile forces of a rope can be obtained. A tension element is retained at two points, and the tension element is deflected in the middle between these two points and is measured. When a load limit is overshot, for example, a signal may be triggered.

Another solution for tension element monitoring is known from the published patent application EP 1847501 A1. The means for tension element monitoring are fastened firmly to a guide track of an elevator system. The belt-like tension element to be monitored is led past a sensing surface. A sensing arrangement is integrated into this sensing surface, for example so that variations in the structure of the monitored tension element can be detected.

A type of measuring gage or alignment aid is known from the published patent application EP 0 498 051 A2. However, this measuring gage or alignment aid is not designed as a measuring gage for clamping between two tension elements, but serves instead for the alignment of guide rails.

SUMMARY

An object, then, is to provide another method and a corresponding device so that differences in the tension stresses in tension elements of a tension element cord can be detected simply and quickly.

One advantage of the invention is that there is no need for additional tools or equipment for the field test of tension stress. Moreover, it is considered an advantage of the invention that the measuring gage is cost-effective and simple to handle. Relative determination of the tension stress of the tension elements of the tension element cord is possible by means of the measuring gage. Also, by means of the measuring gage according to the invention, the tension stress of the tension elements can be set simply and quickly and different tension stresses between the tension elements can be compensated.

DESCRIPTION OF THE DRAWINGS

The invention is described in detail below by means of exemplary embodiments illustrated in the drawings in which.

DETAILED DESCRIPTION

Figure 1:
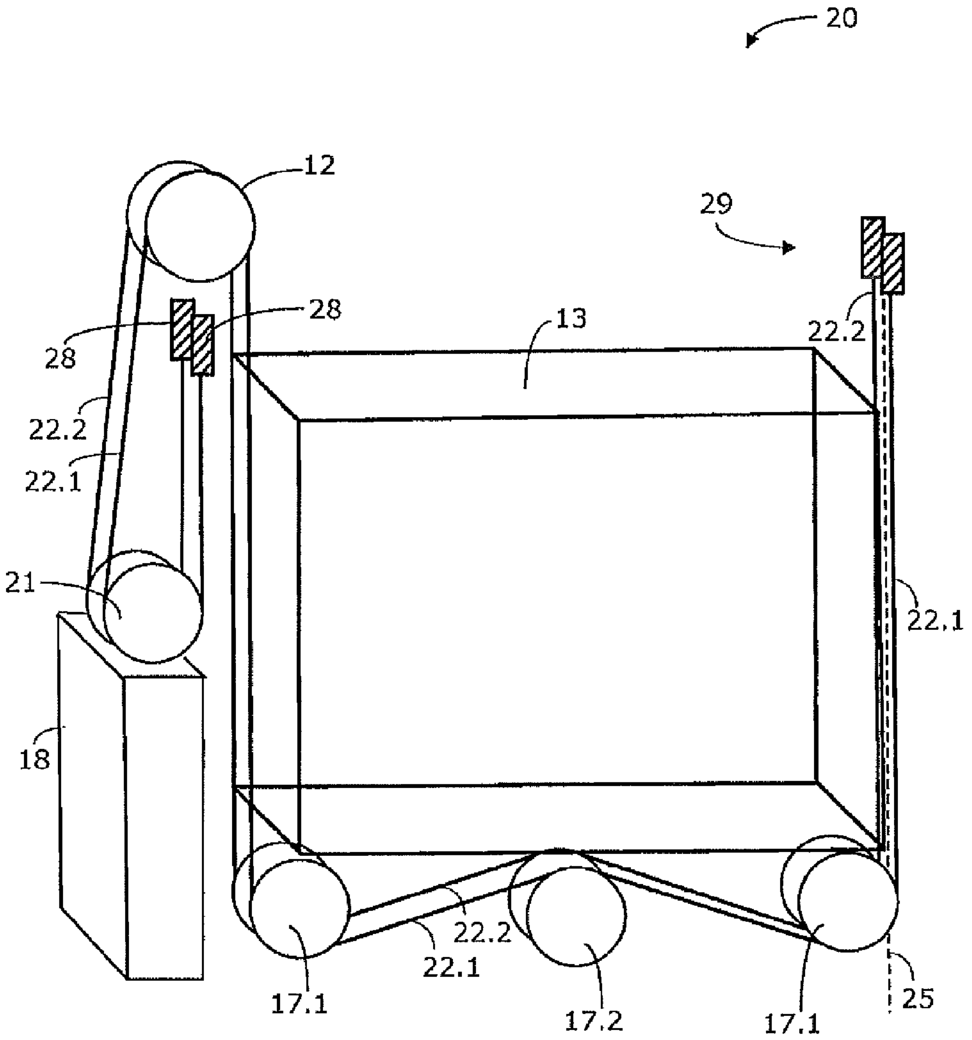
FIG. 1 shows a diagrammatic view of a first previously known elevator system in which a measuring gage according to the invention can be used.

An exemplary elevator system 20, in which a measuring gage according to the invention can be used, is shown in FIG. 1 in a diagrammatic perspective view. This figure shows an elevator system 20 which has no machine space and which comprises an elevator shaft or may be of the shaftless type.

The elevator system 20 comprises an elevator car 13 and at least one first guide rail 25 for the vertical guidance of the elevator car 13. The guide rail 25 is illustrated in FIG. 1 merely by a dashed line. Two tension elements which run essentially parallel to one another are provided here. In the following description and in the figures, the front tension element is designated by 22.1 and the rear tension element by 22.2, where this is necessary to distinguish between them more clearly. At the car-side end of the tension elements, these are fixed in the region of first tension element fixed points 29 to the guide rail 25 or to a shaft wall (not shown). Each of the tension elements 22.1 and 22.2 loops under the elevator car 13, loops around a driving pulley 12, which is arranged upstream of a drive (not visible in FIG. 1) and carries a counterweight 18. In the example shown, the tension elements carry the counterweight 18 in that the tension elements revolve around counterweight rollers 21 and are fixed at the counterweight-side end in the region of second tension element fixed points 28. In the embodiment shown, the underlooping of the elevator car 13 takes place by means of car carrying rollers 17.1 and guide rollers 17.2 which are in this case designed in pairs. The second tension element fixed points 28 may be provided, for example, on a shaft wall or on the console of the drive unit (not shown).

The two tension elements 22.1 and 22.2 run essentially parallel to one another. As seen from the counterweight-side tension element fixed points 28, the tension elements run downward, loop partially around the counterweight carrying rollers 21 and are led further up in the elevator shaft 11 around the driving pulley or driving pulleys 12. The tension elements run from there downward along the left sidewall of the elevator car 13 and are then led at least partially around the car carrying rollers 17.1. This type of suspension is designated as underlooping. On the right side of the elevator car 13, the tension elements are led upward, where each of the tension elements is fastened in the region of car-side tension element fixed points 29 to the guide rail 25 or to a shaft wall.

The term "tension element" is to be understood here as a synonym for any type of rope and means which are suitable for carrying and moving the elevator car 13 and the counterweight 18. The tension elements are preferably flat or V-ribbed belts. In the context of the invention, however, steel or plastic ropes of round cross section may also be used as suspension means.

Figure 2:
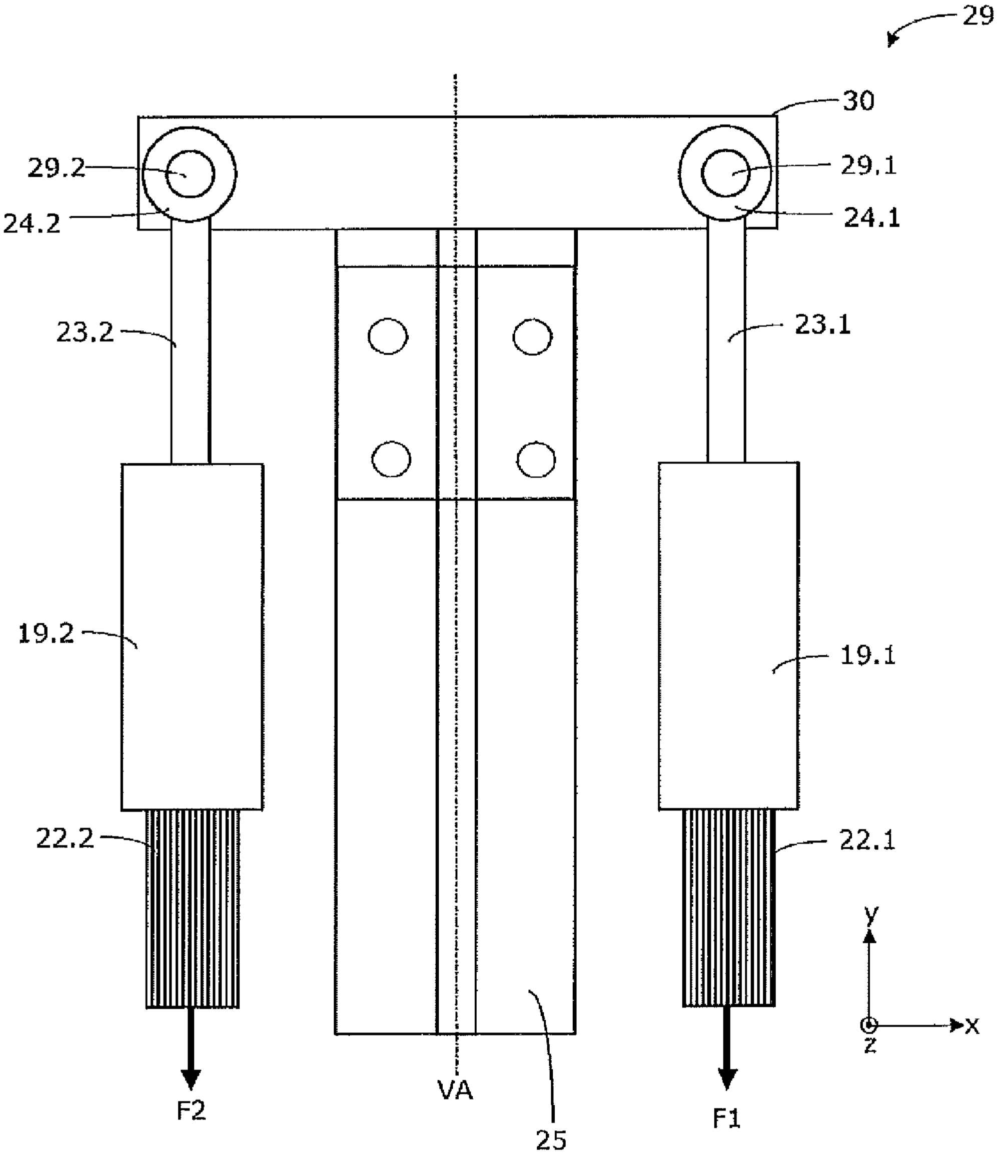
FIG. 2 shows details of a tension element fastening according to the prior art.

FIG. 2 shows exemplary details of the car-side tension element fixed points 29. Fastening may take place, for example, by means of a crossbar 30 which is fastened in the upper region of the guide rail 25.

The two fastening points 29.1 and 29.2 are arranged symmetrically with respect to the vertical axis VA of the guide rail 25. In the example shown, the fastening of the tension elements 22.1 and 22.2 takes place by means of round rods 23.1, 23.2 (also called tension rods) which are mounted in the upper region in lugs 24.1, 24.2. The lugs 24.1, 24.2 are seated on axles, screws or the like and are thus fastened to the crossbar 30. Clamping or screwing devices 19.1, 19.2 (also designated as a belt fastener) are provided, which receive and fix the ends of flat or V-ribbed belts 22.1, 22.2. The round rods 23.1, 23.2 may be designed as threaded spindles, so that the position of the tension element end or the tension stress F1 or F2 of the respective tension element 22.1, 22.2 may be set by rotating the round rods 23.1, 23.2.

Figure 3:
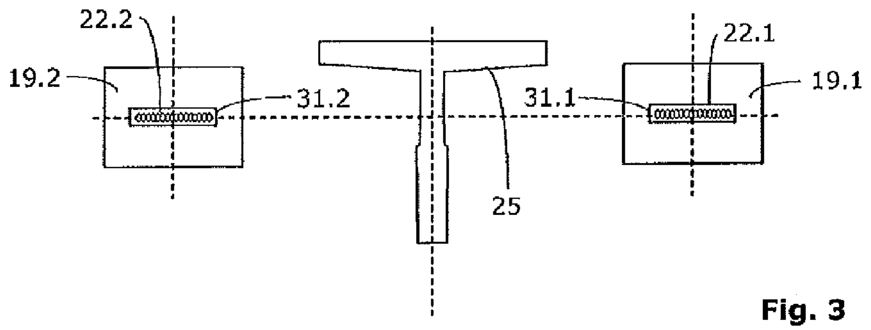
FIG. 3 shows a sectional illustration of the tension element fastening according to FIG. 2.

FIG. 3 shows a section through the fastening region of the device of FIG. 2. FIG. 3 serves for explaining the geometric arrangement of the individual elements.

Figure 4:
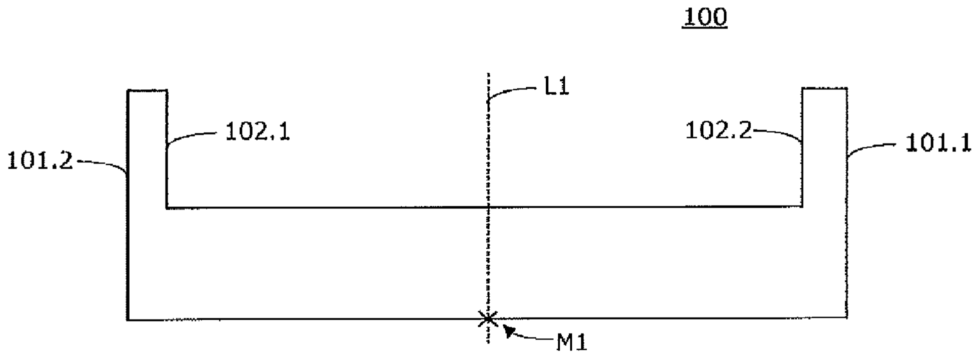
FIG. 4 shows a diagrammatic view of a first measuring gage according to the invention.

FIG. 4 shows a first embodiment of a measuring gage 100 for testing the tension stress in tension elements 22.1, 22.2 of a tension element cord. This measuring gage 100 is distinguished in that it is designed especially for horizontal clamping between two vertically running tension elements 22.1, 22.2, as is described below. For this purpose, the measuring gage 100 has at least two side faces 101.1, 101.2 which lie symmetrically to a reference point M1 or to a center line L1 of the measuring gage 100 and which extend parallel to the center line L1 running through the reference point M1 of the measuring gage 100. The measuring gage 100 is depicted in FIG. 4 on the same scale as the elements of FIG. 3. In order to implement the method according to the invention, the measuring gage 100 is clamped between the two tension elements 22.1, 22.2 of FIG. 3, the inwardly pointing side faces 31.1, 31.2 of the tension elements 22.1, 22.2 bearing against the outwardly pointing side faces 101.1, 101.2 of the measuring gage 100.

The reference point M1 lies on the center line L1 because the tension elements 22.1, 22.2 are arranged symmetrically to the guide rail 25 and the guide rail 25 serves as a fixed point. If an off-center fixed point is referred to, the center point M1 serving as a reference point no longer lies on the center line L1. The reference point M1 is then aligned with the fixed point.

The measuring gage 100, as seen in a top view, preferably has a U-shape or a C-shape, for example so as to be capable of engaging around the guide rail 25 located in the middle. If the measuring gage 100 is to be used at some other point of the elevator system (for example, on the counterweight side), it may also have a different shape, but one in which at least the side faces 101.1, 101.2 are designed symmetrically to the center line L1.

In further embodiments, the measuring gage 100 may have, in addition to the two side faces 101.1, 101.2, for example two further side faces 102.1, 102.2 which also lie symmetrically to the center line L1 of the measuring gage 100. In the embodiment shown in FIG. 4, these further side faces 102.1, 102.2 point inward.

Figure 5A:
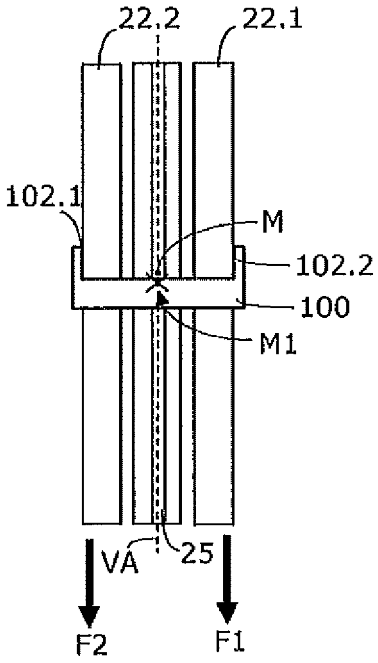
FIG. 5A shows details of a tension element cord with two tension elements which run along a guide rail and which both have a uniform tension load, a first method step of the invention being shown.
Figure 5B:
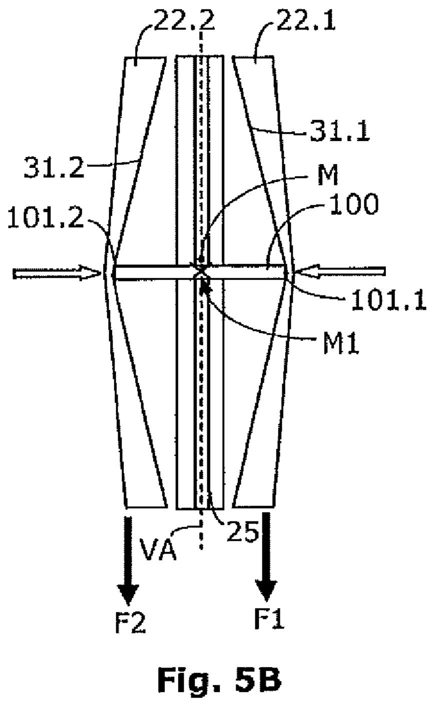
FIG. 5B shows details of the tension element cord according to FIG. 5A, a second method step of the invention being shown.
Figure 5C:
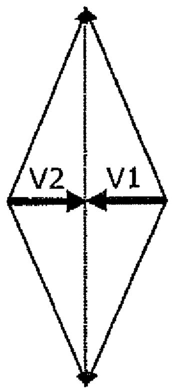
FIG. 5C shows a diagrammatic illustration of a parallelogram of forces.

The method according to the invention for testing the tension stress in tension elements 22.1, 22.2, 22.3, 22.4 of a tension element cord is explained, then, by means of the exemplary FIGS. 5A-5C. The method preferably comprises the following steps:

a. Provision of a measuring gage 100 which is designed to be clamped between at least two tension elements 22.1, 22.2 of the tension element cord. The measuring gage 100 may, for example, be the embodiment of FIG. 4, 7, 8 or 10.
b. Definition of a fixed point M at a stationary point (for example, on the guide rail 25). This takes place, for example, in that the measuring gage 100 is held essentially horizontally to the tension elements 22.1, 22.2, 22.3, 22.4 or at right angles to the tension elements 22.1, 22.2, 22.3, 22.4 such that the two inwardly pointing faces 102.1, 102.2 coincide with the outwardly pointing side faces of the tension elements 22.1, 22.2. Preferably, in this step b., care is taken to ensure that the tension elements 22.1, 22.2, 22.3, 22.4 are not displaced or pressed to the side. In step b., the reference point M1, which may be marked, for example, on the measuring gage 100, is transferred to the guide rail 25, for example, by means of a pencil, sticker or other marking. The corresponding stationary point or fixed point is identified here by M.
c. This is then followed by the essentially horizontal clamping of the measuring gage 100 between the essentially vertically running length sections of the two tension elements 22.1, 22.2 of the tension element cord, as shown in FIG. 5B. For this purpose, the measuring gage 100 may be tilted, for example, through 90°. Preferably, the measuring gage 100 is clamped such that the inwardly pointing side faces 31.1, 31.2 of the tension elements 22.1, 22.2 bear against the outwardly pointing side faces 101.1, 101.2 of the measuring gage 100.
d. It is then determined whether the reference point M1 of the measuring gage 100 deviates in an essentially horizontal direction with respect to the fixed point M. In the example shown in FIG. 5B, the measuring gage 100 is seated exactly in the middle between the tension elements 22.1, 22.2, and the reference point M1 of the measuring gage 100 is ideally congruent with the defined fixed point M on the guide rail 25. It can be concluded from this that the tension stresses F1 and F2 in both tension elements 22.1, 22.2 are identical, that is to say F1=F2. FIG. 5C shows by means of a diagrammatic parallelogram of forces that, in a fully symmetrical tension stress situation, the two horizontal force vectors V1 and V2 which act laterally upon the measuring gage 100 cancel (compensate) one another.

If, in step d, a displacement of the reference point M1 with respect to the fixed point M in the horizontal direction occurs, the following proposition applies. The displacement is in each case proportional to the absolute amount of the difference of the tension stresses |F1−F2| in the two tension elements 22.1, 22.2.

Figure 6A:
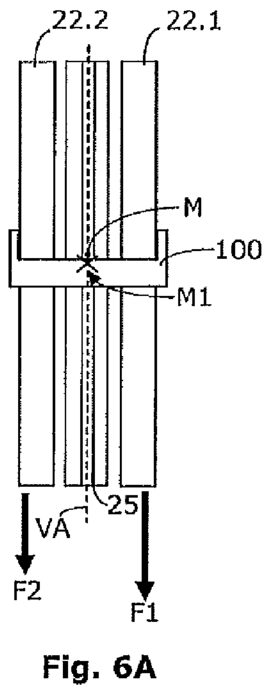
FIG. 6A shows details of a tension element cord with two tension elements which run along a guide rail and which both have a nonuniform tension load, a first method step of the invention being shown.
Figure 6B:
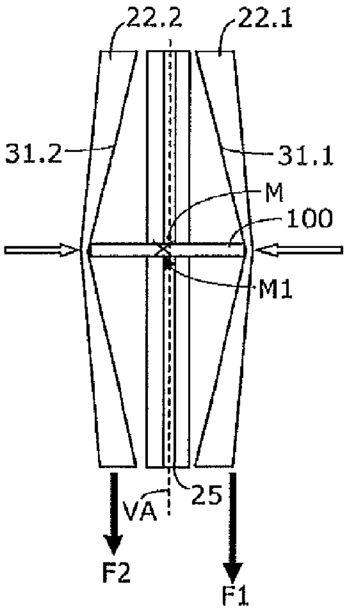
FIG. 6B shows details of the tension element cord according to FIG. 6A, a second method step of the invention being shown.
Figure 6C:
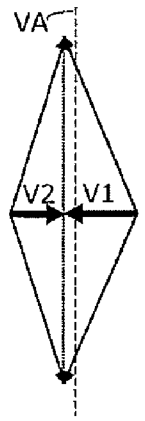
FIG. 6C shows a diagrammatic illustration of a parallelogram of forces.

The exemplary FIGS. 6A-6C show a situation with asymmetric tension stresses F1>F2, F1 being the tension stress in the tension element 22.1 and F2 being the tension stress in the tension element 22.2. Since a higher tension stress F1 is present in the tension element 22.1 than in the tension element 22.2, the measuring gage 100, after being clamped (step c. of the method), is pressed slightly to the left. This displacement can be seen if the position of the reference point M1 of the measuring gage 100 is considered in relation to the stationary fixed point M. M1 here lies somewhat to the left of M. By means of the parallelogram of forces in FIG. 6C, it can be shown that the force vector V1 is greater than the force vector V2. The center line L1 of the measuring gage 100 is thereby displaced with respect to the vertical axis VA of the guide rail 25.

Figure 7:
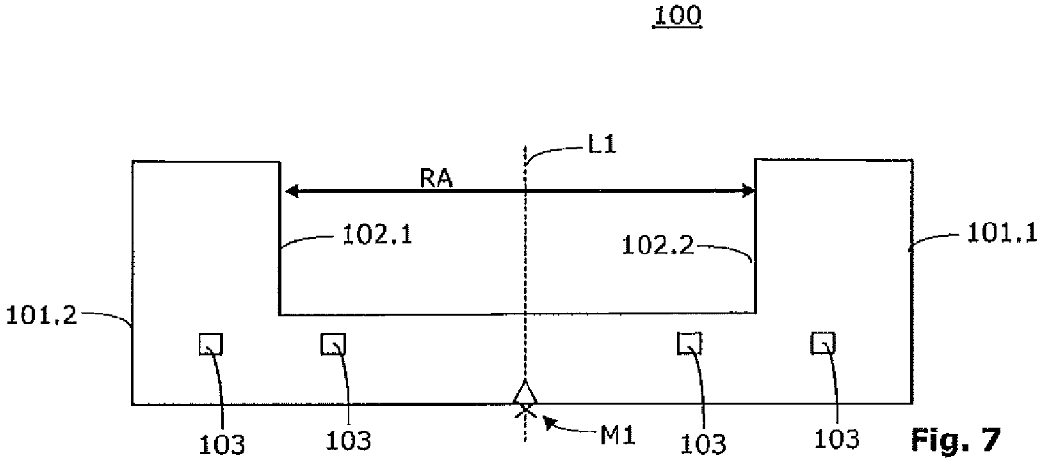
FIG. 7 shows a diagrammatic view of a second measuring gage according to the invention.

FIG. 7 shows a further embodiment of a measuring gage 100 for testing the tension stress in tension elements 22.1, 22.2 of a tension element cord. This measuring gage 100 is distinguished in that it is designed specially to be clamped horizontally between two essentially vertically running tension elements 22.1, 22.2, as is described below. For this purpose, it has at least two side faces 101.1, 101.2 which lie symmetrically to a reference point M1 or to a center line L1 of the measuring gage 100 and which extend essentially parallel to the center line L1 running through the reference point M1 of the measuring gage 100. The measuring gage 100 in FIG. 7 has embedded (stability) bodies 103 in order to prevent distortion or flexion. That is to say, the (stability) bodies 103 serve for increasing the inherent rigidity of the measuring gage 100. The measuring gage 100 according to FIG. 7 may also be clamped between the two tension elements 22.1, 22.2 of, for example, FIG. 3, the inwardly pointing side faces 31.1, 31.2 of the tension elements 22.1, 22.2 bearing against the outwardly pointing side faces 101.1, 101.2 of the measuring gage 100.

The measuring gages 100 are preferably provided with a defined reference spacing RA. The reference spacing RA may amount, for example, to 175 mm in the embodiment according to FIG. 7. This applies to all the embodiments shown.

Figure 8:
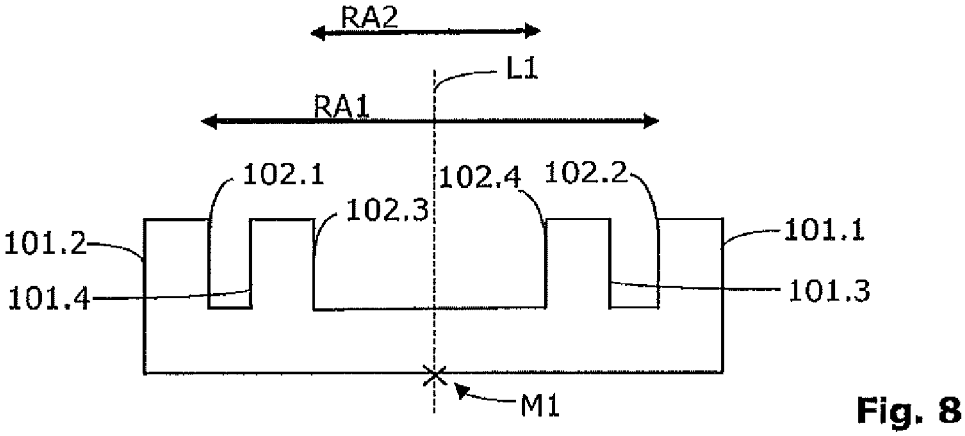
FIG. 8 shows a diagrammatic view of a third measuring gage according to the invention.

FIG. 8 shows a further embodiment of a measuring gage 100 for testing the tension stress in a plurality of tension elements 22.1, 22.2, 22.3, 22.4 of a tension element cord. This measuring gage 100 is distinguished in that it is designed specially to be clamped essentially horizontally between a plurality of the essentially vertically running tension elements 22.1, 22.2, 22.3, 22.4, as is described below. For this purpose, it has a plurality of side faces 101.1 and 101.2 and also 101.3 and 101.4 which lie in pairs symmetrically to a reference point M1 or to a center line L1 of the measuring gage 100 and which extend parallel to the center line L1 running through the reference point M1 of the measuring gage 100. The measuring gage 100 in FIG. 8 may again have embedded (stability) bodies 103 which, however, are not shown here.

Figure 9A:
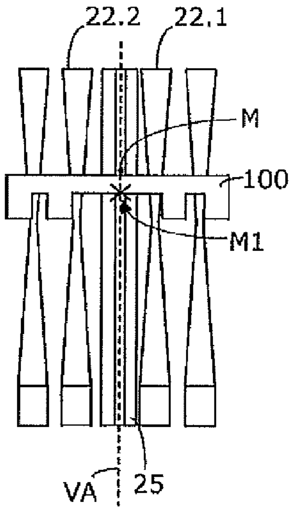
FIG. 9A shows details of a tension element cord with four tension elements which run along a guide rail, a first method step of the invention being shown.
Figure 9B:
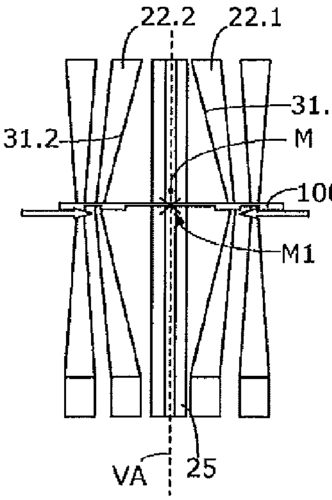
FIG. 9B shows details of the tension element cord according to FIG. 9A, a further method step of the invention being shown.
Figure 9C:
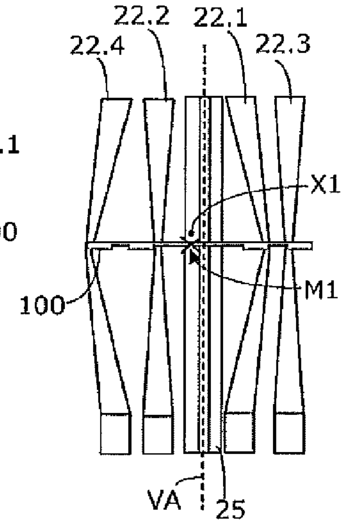
FIG. 9C shows details of the tension element cord according to FIG. 9A, yet a further method step of the invention being shown.

It is shown by means of FIGS. 9A, 9B and 9C how the measuring gage 100 of FIG. 8 can be used on tension element cords having a plurality of tension elements 22.1, 22.2, 22.3, 22.4.

The measuring gage 100 according to FIG. 8 can be used to define a fixed point M (called step b.) at a stationary point of, for example, an elevator system 20. This takes place, for example, in that the measuring gage 100 is held, for example, on the two middle tension elements 22.1, 22.2 such that the two inwardly pointing faces 102.3, 102.4 coincide with outwardly pointing side faces of the tension elements 22.1, 22.2. Preferably, in this step b., care is taken to ensure that the tension elements 22.1, 22.2 are not displaced or pressed to the side. In step b, the reference point M1, which may be marked, for example, on the measuring gage 100, is transferred, for example, by means of a pencil or by other means to the guide rail 25. The corresponding stationary point is identified here by M and is designated as a fixed point.

This is followed by the essentially horizontal clamping (called step c.) of the measuring gage 100 between the vertically running length sections of the two tension elements 22.1, 22.2 of the tension element cord, as shown in FIG. 9B. For this purpose, the measuring gage 100 may be tilted, for example, through 90°. The measuring gage 100 is preferably clamped such that the inwardly pointing side faces 31.1, 31.2 of the suspension means 22.1, 22.2 bear against the outwardly pointing side faces 101.3, 101.4 of the measuring gage 100. It can thus be determined whether an essentially horizontal displacement of the point M1 with respect to the fixed point M occurs due to asymmetric tension bad distribution in the two inner tension elements 22.1, 22.2.

In a purely symmetrical procedure which still refers to the previously defined fixed point M, the measuring gage 100 can then be clamped, for example, with the outwardly pointing side faces 101.1, 101.2 between the two outer tension elements 22.3, 22.4 (this not being shown in the figures), in order, here too, to determine whether horizontal displacement of the reference point M1 with respect to the fixed point M occurs due to asymmetric tension load distribution in the two outer tension elements 22.3, 22.4.

However, other relative considerations may also be implemented, in that, for example, the measuring gage 100 is clamped with the outermost side face 101.2 between the outermost tension element 22.4 and with the side face 101.3 against the tension element 22.1. This situation is indicated in FIG. 9C. If, then, in this situation the instantaneous position X1 of the reference point M1 is transferred to a stationary fixed point, for example, on the guide rail 25, in a further step the measuring gage 100 can be used in a reversed situation (in a position mirrored with respect to the vertical axis VA). In this reversed situation, the measuring gage 100 would then be seated in a similar way between the tension elements 22.3 and 22.2. Here, too, once again, the instantaneous position X2 (not shown) of the reference point M1 is transferred to a stationary fixed point, for example, on the guide rail 25. Since the measuring gage 100 is used here asymmetrically with respect to the absolute middle position (defined, for example, by the vertical axis VA), the horizontal spacing between the points X1 and X2 must then be related, for example, to the position of the vertical axis VA. If the spacing between the vertical axis VA and the point X1 and the spacing between the vertical axis VA and the point X2 are identical, then the tension loads in all four tension elements are identical (called a case of symmetry).

The measuring gage may also be used for measuring the tension stress in the tension elements 22.1, 22.2 running underneath the elevator car 13. In this case, a stationary fixed point M is defined, and this is transferred as a reference point to the measuring gage before clamping essentially at right angles to the tension stresses between two tension elements. The distance between the fixed point and reference point and the displacement direction of the reference point are the measure for different tension stresses in the tension elements.

However, the invention may also be used on other elevator systems with different tension element configurations (for example, with an asymmetric tension element cord having, for example, three tension elements on one side of the guide rail). The method is employed here in a similar way so that relative evidence is possible.

Figure 10:
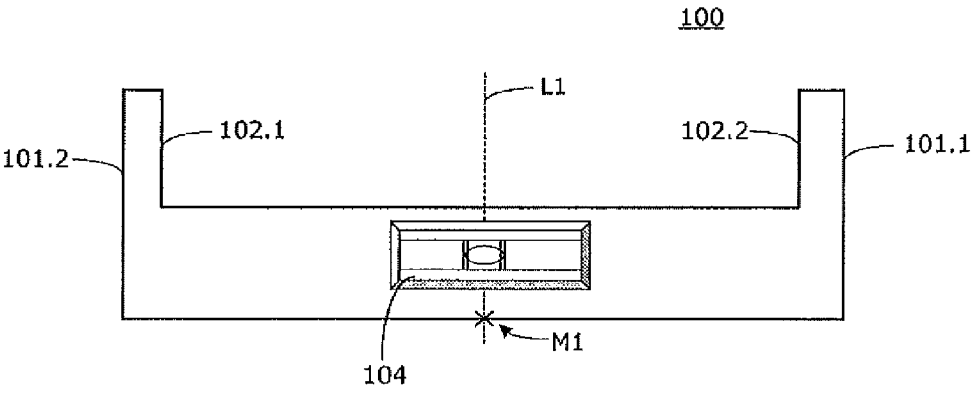
FIG. 10 shows a diagrammatic view of a fourth measuring gage according to the invention.

In order to make it possible to clamp the measuring gage 100 horizontally between two or more vertically running tension elements 22.1, 22.2, 22.3, 22.4, in a preferred embodiment the measuring gage 100 may comprise a spirit level. Preferably, a spirit level attachment is provided on the measuring gage 100 or, as indicated in FIG. 10, a spirit level bubble 104 is integrated into the measuring gage 100.

The measuring gage 100 is preferably manufactured from a plastic (for example, acrylic or nylon). However, for example, a measuring gage 100 manufactured from metal may also be used.

The present invention may advantageously be used in an elevator system according to FIG. 6 of the initially mentioned patent application EP 1847501 A1. There, the respective tension elements are supported on a console by means of a tension rod, belt fastener and compression spring. The compression spring is intended to compensate different tension stresses in the individual tension elements. In practice, however, the compression springs have high tolerances in terms of length and rigidity, thus leading, in turn, to different tension stresses and different loads in the individual tension elements. If the measuring gage 100 is used in such an elevator system, then different tension stresses can be revealed quickly and simply. Differences can be compensated by adjusting the tension rods.

However, the principle according to the invention can also be applied to elevator systems which have no compression springs, as shown, for example, in FIG. 2. Here, too, any differences can be compensated by adjusting the round rods 23.1, 23.2.

It is obvious that there are other similar possibilities for using a measuring gage 100 according to the invention. Arrangements having at least one tension element cord composed of belts, ropes or bands (belt drives, ropeways or conveyor bands) may be envisaged for the use of the measuring gage according to the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for testing a tension stress in tension elements of a tension element cord, comprising the following steps:

providing a measuring gage which is configured to be clamped between two tension elements of the tension element cord, the measuring gage having a reference point;

holding the measuring gage adjacent the tension elements and establishing a fixed point at a point stationary with respect to the tension element cord using the reference point of the measuring gage;

clamping the measuring gage between sections of the two tension elements of the tension element cord; and determining whether displacement of the reference point of the measuring gage with respect to the fixed point occurs, such displacement being dependent on and an indication of a difference of tension stresses in the two tension elements.

2. The method according to claim 1 wherein the two tension elements are belts or ropes.

3. The method according to claim 1 including performing the method in an elevator system to detect different tension stresses in two tension elements of the elevator system.

4. The method according to claim 3 wherein the fixed point is on a guide rail of the elevator system which is located between the two tension elements.

5. The method according to claim 1 wherein the reference point of the measuring gage is marked on the measuring gage and the fixed point is established by transferring the reference point to the stationary point.

6. The method according to claim 1 wherein the measuring gage is clamped between the two tension elements by the two tension elements being pressed apart from one another.

7. The method according to claim 1 wherein the tension element cord has more than two of the tension elements and the steps of clamping and determining are repeated for different pairs of the tension elements of the tension element cord.

8. The method according to claim 1 wherein the measuring gage, after being clamped, extends longitudinally in a direction perpendicular to a longitudinal direction of each of the tension elements before clamping.

9. The method according to claim 1 adjusting the tension stress in at least one of the two tension elements based upon the displacement of the reference point of the measuring gage.

* * * * *